US008547604B2

(12) United States Patent
Kozaki et al.

(10) Patent No.: US 8,547,604 B2
(45) Date of Patent: Oct. 1, 2013

(54) CABLE ARRANGEMENT STRUCTURE AND IMAGE SCANNER EMPLOYING THE SAME

(75) Inventors: Daisuke Kozaki, Aichi (JP); Miki Maekawa, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 212 days.

(21) Appl. No.: 13/037,877

(22) Filed: Mar. 1, 2011

(65) Prior Publication Data

US 2011/0211234 A1    Sep. 1, 2011

(30) Foreign Application Priority Data

Mar. 1, 2010    (JP) .................................. 2010-044270

(51) Int. Cl.
*H04N 1/04*    (2006.01)
(52) U.S. Cl.
USPC ........ 358/474; 358/486; 358/497; 271/10.03; 271/110
(58) Field of Classification Search
USPC ...... 358/474, 486, 497, 496, 498; 271/10.03, 271/110, 10.09
See application file for complete search history.

(56) References Cited

U.S. PATENT DOCUMENTS

| | | | | |
|---|---|---|---|---|
| 4,737,848 A | * | 4/1988 | Kohno | 348/536 |
| 4,965,638 A | * | 10/1990 | Hediger | 358/497 |
| 4,982,236 A | * | 1/1991 | Bock | 399/211 |
| 4,987,442 A | | 1/1991 | Uemori | |
| 5,019,703 A | * | 5/1991 | Boyd et al. | 250/208.1 |
| 5,595,448 A | * | 1/1997 | Harada | 400/320 |
| 6,135,439 A | * | 10/2000 | Ikeda | 271/10.03 |
| 6,183,151 B1 | * | 2/2001 | Kono | 400/582 |
| 6,357,580 B1 | | 3/2002 | Ismai | |
| 6,690,494 B1 | * | 2/2004 | Yamada | 358/497 |
| 6,927,879 B2 | * | 8/2005 | Takahashi | 358/471 |
| 6,953,898 B2 | * | 10/2005 | Chen et al. | 174/99 R |
| 7,262,365 B2 | | 8/2007 | Chen et al. | |

(Continued)

FOREIGN PATENT DOCUMENTS

| | | |
|---|---|---|
| CN | 101150644 A | 3/2008 |
| CN | 101401290 A | 4/2009 |

(Continued)

OTHER PUBLICATIONS

JP Notification of Reasons for Rejection dated Mar. 13, 2012, corresponding Application No. 2010-044270; English Translation.

(Continued)

*Primary Examiner* — Negussie Worku
(74) *Attorney, Agent, or Firm* — Banner & Witcoff, Ltd.

(57) ABSTRACT

A cable arrangement structure is provided with a movable body configured to reciprocally move relative to a base member, and a flexible cable transmitting electrical signals. One end of the flexible cable is fixedly connected to the base member, and another end is connected to the movable body. The flexible cable has a curved portion, and both ends of the flexible cable being located on a same side with respect to the curved portion. A tension applying unit configured to contact the curved portion of the flexible cable from an inner side of a curvature of the curved portion to apply tension to the flexible cable when the curved portion is located on a front direction of the movable body as moved. Application of the tension to the flexible cable is controlled in mechanical association with movement of the movable body.

15 Claims, 11 Drawing Sheets

(56) References Cited

U.S. PATENT DOCUMENTS

| | | | |
|---|---|---|---|
| 7,388,154 B2* | 6/2008 | Chen et al. | 174/117 F |
| 7,737,610 B2 | 6/2010 | Yoshida et al. | |
| 7,954,932 B2 | 6/2011 | Kawamura et al. | |
| 7,969,621 B2 | 6/2011 | Shunji | |
| 2004/0182594 A1 | 9/2004 | Chen et al. | |
| 2005/0205286 A1 | 9/2005 | Chen et al. | |
| 2007/0059963 A1* | 3/2007 | Chen et al. | 439/298 |
| 2008/0068679 A1 | 3/2008 | Murai | |
| 2009/0026886 A1 | 1/2009 | Yoshida et al. | |
| 2009/0167825 A1 | 7/2009 | Kawamura et al. | |

FOREIGN PATENT DOCUMENTS

| | | |
|---|---|---|
| CN | 101468560 A | 7/2009 |
| JP | 62-210822 | 9/1987 |
| JP | 63-253813 | 10/1988 |
| JP | 01-159537 | 11/1989 |
| JP | 01-0159538 | 11/1989 |
| JP | 02-053663 A | 4/1990 |
| JP | 02-068626 | 5/1990 |
| JP | 08-146528 A | 6/1996 |
| JP | 2001-058715 A | 3/2001 |
| JP | 2002-247291 A | 8/2002 |
| JP | 2004-310062 A | 11/2004 |
| JP | 2004-333604 | 11/2004 |
| JP | 2006039057 A | 2/2006 |
| JP | 2008-078851 | 4/2008 |

OTHER PUBLICATIONS

CN Office Action mailed May 10, 2013, CN Appln. 201110062474.5, English translation.

* cited by examiner

US 8,547,604 B2

CABLE ARRANGEMENT STRUCTURE AND IMAGE SCANNER EMPLOYING THE SAME

CROSS-REFERENCE TO RELATED APPLICATION

This application claims priority under 35 U.S.C. §119 from Japanese Patent Application No. 2010-044270 filed on Mar. 1, 2010. The entire subject matter of the application is incorporated herein by reference.

BACKGROUND

1. Technical Field

Aspects of the present invention relate to a cable arrangement structure and an image scanner employing the cable arranging structure.

2. Related Art

Conventionally, there has been known a cable arrangement structure employed, for example, in an image scanner. Specifically, such a cable arrangement structure is configured such that an end of a cable having a curved portion (e.g., U-shaped or J-shaped portion) is connected to a movable body (e.g., a scanning head) which reciprocates inside the image scanner.

SUMMARY

In the cable arrangement structure as described above, if the curved portion is located on a downstream side in a moving direction of the movable body, stress (a compressing force) is applied to the portion of the cable from a connecting portion at which the cable is connected to the movable body to the curved portion, and the cable may be buckled (bent) at such a position. Once the buckling occurs, the buckled portion may move as the moving body proceeds. In such a case, the cable may be damaged quickly.

It is generally known that a buckling load is larger as a Young's modulus of the cable is greater, as is derived from the well-known Euler's formula of the buckling load. Thus, in conventional art, an elastic member (e.g., tension tape) is adhered to the cable to increase the combined Young's modulus of the cable and suppress occurrence of the buckling.

In the conventional art as described above, however, it is necessary to monitor the combined Young's modulus strictly since the bucking may occur if the Young's modulus decreases, which causes yield rate to be lowered.

According to aspects of the invention, the buckling of the cable is suppressed because of a configuration different from the conventional art so that monitoring of the Young's modulus is not necessitated.

According to aspects of the invention, there is provided a cable arrangement structure, which is provided with a base member, a movable body configured to reciprocally move relative to the base member, a driving unit configured to drive the movable body to reciprocate, a flexible cable transmitting electrical signals, one end of the flexible cable being fixedly connected to the base member, another end of the flexible cable being connected to the movable body, the flexible cable having a curved portion, both ends of the flexible cable being located on a same side with respect to the curved portion, and a tension applying unit configured to contact the curved portion of the flexible cable from an inner side of a curvature of the curved portion to apply tension to the flexible cable when the curved portion is located on a front direction of the movable body as moved, application of the tension to the flexible cable being controlled in mechanical association with movement of the movable body.

According to aspects of the invention, there is provided an image scanner which employs the cable arrangement structure as above.

BRIEF DESCRIPTION OF THE ACCOMPANYING DRAWINGS

Figure 11:
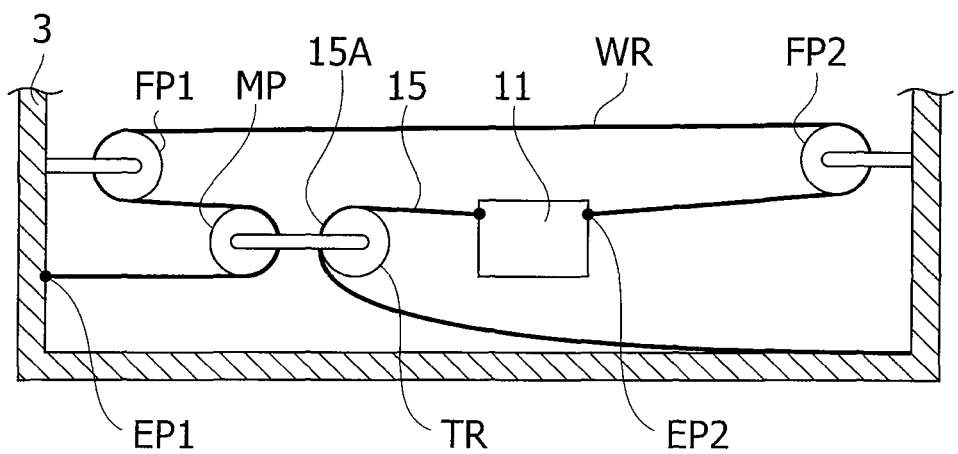

FIG. 11 schematically shows a cross-sectional view of a mechanism of moving a tension roller according to an alternative embodiment.

DETAILED DESCRIPTION

Hereinafter, exemplary embodiments according to aspects of the present invention will be described with reference to the accompany drawings.

In the following description, a flatbed scanner 1 will be described. The flatbed scanner 1 according to the embodiment is capable of performing a first scanning function to automatically feeding original documents and scanning images thereon, and a second scanning function to scan an image on an original sheet placed at a scanning position.

Figure 1:
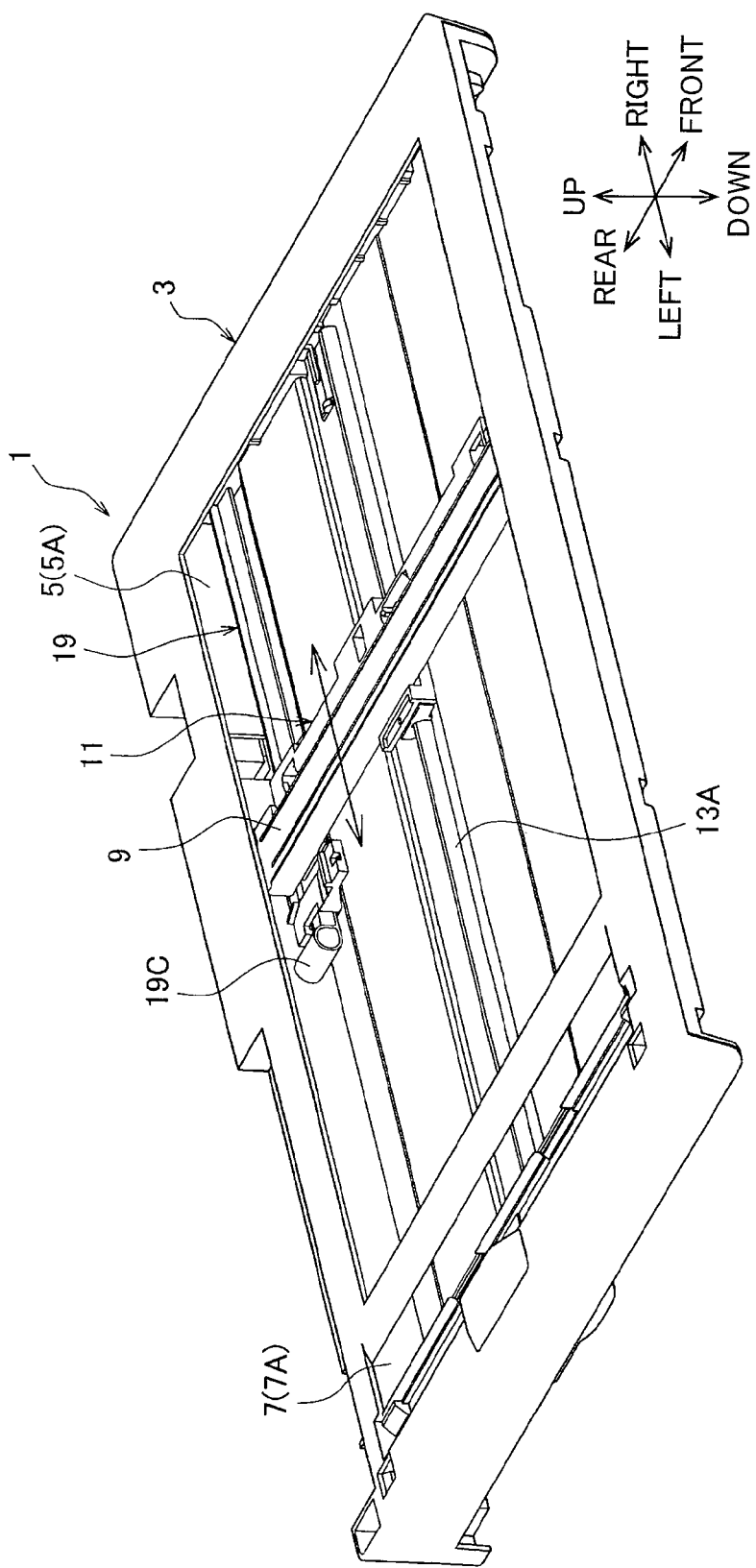
FIG. 1 is a perspective view of a part of an image scanner according to a first embodiment.

As shown in FIG. 1, on a document table 3 where an original document is to be placed, a document scanning window 5 extending in a horizontal direction is defined. Next to the window 5, another window 7 is defined. The windows 5 and 7 are covered with transparent platens 5A and 7A formed of glass or Acrylic material, respectively.

A well-known document cover (not shown in FIG. 1) is rotatably attached to the document table 3 so that it is closed/opened with respect to the document table 3. Specifically, the document cover covers an original document placed on the window 5 when located at a closed position, while the window 5 is exposed to outside when the document cover is located at an opened position. On an upper surface of the document cover, a well-known automatic sheet feeder (ASF) that automatically feeds a plurality of sheets of original documents is provided. The documents fed by the ASF passes over the window 7 one by one.

A carriage 11 is a movable body which is installed inside the document table 3 and movable in a longitudinal direction (i.e., in the right and left direction in FIG. 1) of the document table 3. An image capturing unit 9 is mounted on the carriage 11.

The image capturing unit 9 is provided to receive light reflected by the original document, and generates an electric signal in accordance with the received light. The carriage 11 and the image capturing unit 9 extend in a direction perpendicular to a movable direction of the carriage 11 (i.e., extend in a width direction), below the first and second windows 5 and 7. The image scanner 1 scans images formed on the original document by converting the image (i.e., the reflected light) into corresponding electric signals through the image capturing unit 9. In an exemplary embodiment, a CIS (contact image sensor) is used as the image capturing unit 9.

When the scanning is performed using the ASF, the image scanning unit 9 is located at a home position, i.e., a position immediately below the scanning window 7 (see FIG. 3) to scan the image formed on the original document passing through the scanning window 7. This operation will be referred to as a first scanning operation.

When the original document is placed on the platen 5A, the image scanning unit 9 moves in a direction separating from the scanning window 7 under the scanning window 5. This operation will be referred to as a second scanning operation. When the second scanning operation is completed, the image scanning unit 9 is moved back, at a speed faster than that when scanning is performed, to the home position.

Figure 2:
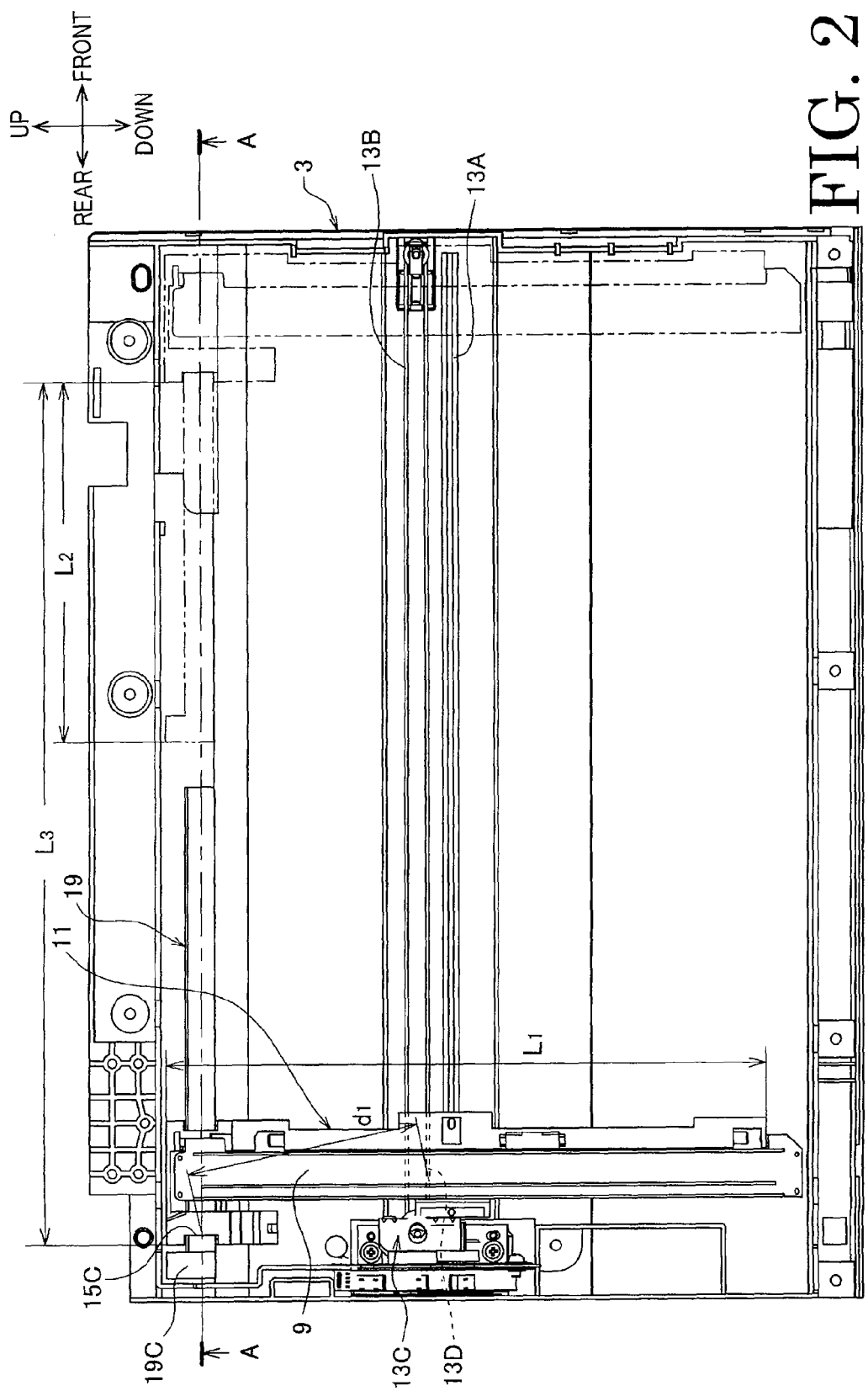
FIG. 2 is a plan view of the image scanner according to the first embodiment.

In the document table 3, at a central portion in the width direction thereof, a guide bar 13A which extends in the movable direction of the carriage 11 and guides the movement of the carriage 11, and a belt 13B for moving the carriage 11 along the guide bar 13A are provided as shown in FIG. 2.

On the window 7 side (i.e., on the left-hand side in FIG. 2), in the longitudinal direction, of the document table 3, actuators such as a motor 13C for driving the belt 13B are provided. As the motor 13C is driven to move the belt 13B, the carriage 11 is driven to reciprocate in the longitudinal direction of the document table 3.

A cable 15 for transmitting the electrical signal generated by the image capturing unit 9 to a scan control unit (not shown) is connected to the image capturing unit 9. The cable 15 is a flexible flat cable (FFC) arranged inside the document table 3, and one end portion of the cable 15 is fixedly secured to the document table 3 with a double-sided adhesion tape or the like (see FIG. 5). The other end portion of the cable 15 is connected to the carriage 11. The cable 15 has a U-shaped (or J-shaped) portion (hereinafter, also referred to as a curved portion) 15A, which is formed on the window 7 side with respect to the carriage 11.

When the second scanning operation is performed, the cable 15 elastically deforms such that a location of a curved portion 15A moves away from the window 7 as the carriage 11 moves for the second scanning. When the second scanning operation is completed and the carriage 11 returns to the home position, the cable 15 deforms such that the location of the curved portion 15A approaches the window 7.

According to the above configuration, a connection portion 15C connecting the cable 15 with the carriage 11, and an operating portion 13D at which the belt 13B transmits the moving force thereof to the carriage 11 are arranged on the same side, in the longitudinal direction of the carriage 11 so that a distance d1 between the connection portion 15C and the operating portion 13D is less than a half of the size L1 of the carriage 11 in the longitudinal direction.

Figure 4:
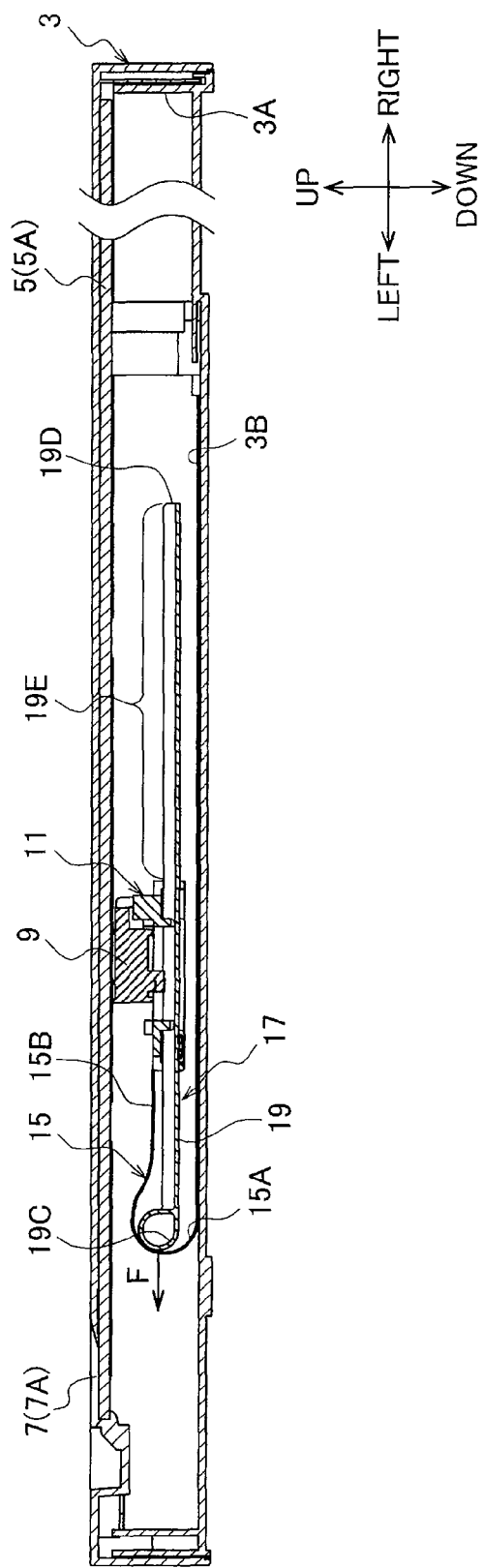

When the second scanning operation is completed and the carriage 11 is returning to the home position, the curved portion 15A is located on the front side (downstream side), in the moving direction of the carriage 11, as shown in FIG. 4. Under such a condition, a compressing force is applied to an upper straight portion 15B between the connection portion 15C and the curved portion 15A (see FIGS. 4-6). Therefore, the upper straight portion 15B tends to be buckled relatively easily.

In addition, according to the above configuration, the curved portion 15A and/or the upper straight portion 15B may contact the platen 5A when the carriage is returning to the home position (see FIGS. 5 and 6), and since the carriage 11 moves relatively quickly, large compression force may be applied to the straight portion 15B, which may causes the buckling of the cable 15.

According to the first embodiment, to prevent the straight portion 15B from buckling due to the compression force, a tension applying mechanism 17 is provided. The tension applying mechanism 17 contacts the curved portion 15A from an inner side of the curvature to apply tension to the cable 15.

As will be described, the tension applying mechanism 17 is configured to operate in mechanical association with the movement of the carriage 11 to apply tension to the cable 15 without using an electrical actuator.

Figure 7:
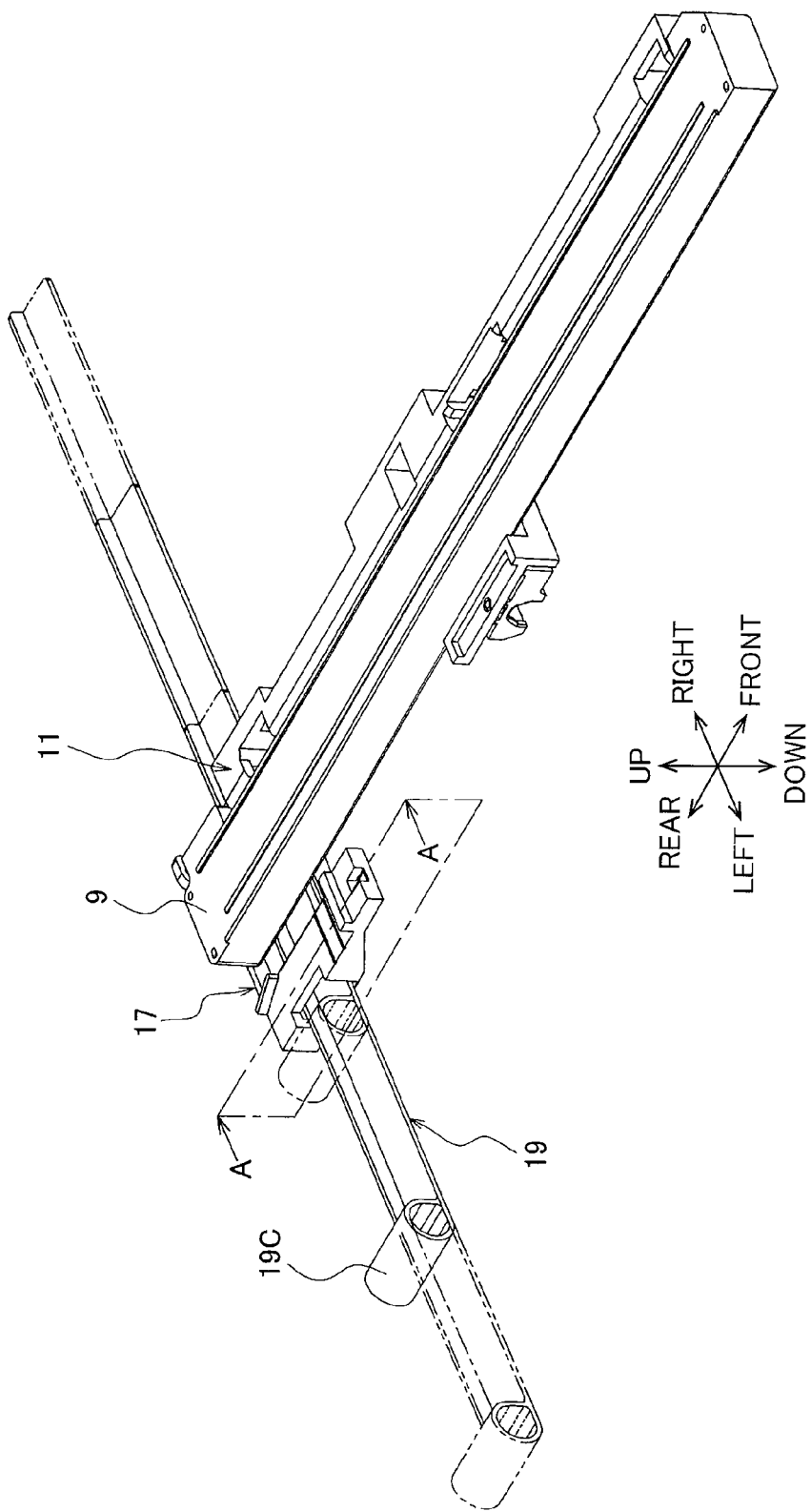
FIG. 7 is a perspective view showing an arrangement of the tension bar, a carriage and the like according to the first embodiment.

As shown in FIG. 7, the tension applying mechanism 17 includes a tension bar 19 which is movably coupled to the carriage 11. The tension bar 19 is movable with respect to the carriage 11 in a carriage moving direction (i.e., right and left direction). The tension applying mechanism 17 further includes a resisting member 21 (see FIG. 8) which applies a resisting force to resist a displacement of the tension bar 19 to reduce a relative distance between the curved portion 15A and the carriage 11.

At an end portion in the longitudinal direction of the carriage 11, a groove portion 11A is formed. The groove portion 11A has an angled U-shaped cross section in a moving direction of the carriage 11 and is opened upward. The image capturing unit 9 is fitted in the groove 11A when in use.

On each of a pair of walls 11B which face each other with the groove 11A located therebetween, a support opening 11C, through which the tension bar 19 is inserted, is formed. The tension bar 19 is slidably supported by the support openings 11C so that the tension bar 19 can be displaced in the direction parallel with the moving direction of the carriage 11C. Specifically, the tension bar 19 has an L-shaped cross section taken along a plane extending in a rear-and-front, and up-and-down directions. The support openings 11C are formed to fit on the cross-sectional shape of the tension bar 19.

According to the embodiment, the tension bar 19 is located below the image capturing unit 9, and, in a plan view, the image capturing unit 9 overlaps on a part of the tension bar 19 in the longitudinal direction thereof (see FIG. 2).

The tension bar 19 includes a plate portion 19A, and protruded portions 19B which are perpendicularly protruded from the plate portion 19A at both side ends (in the front and rear direction ends) of the plate portion 19A. The plate portion 19A is an elongated plate-like portion extending in a direction parallel with the moving direction of the carriage 11. On the curved portion 15A side of the tension bar 19, a contact portion 19C formed to have a smoothly curved surface is provided, as shown in FIG. 4.

Figure 8:
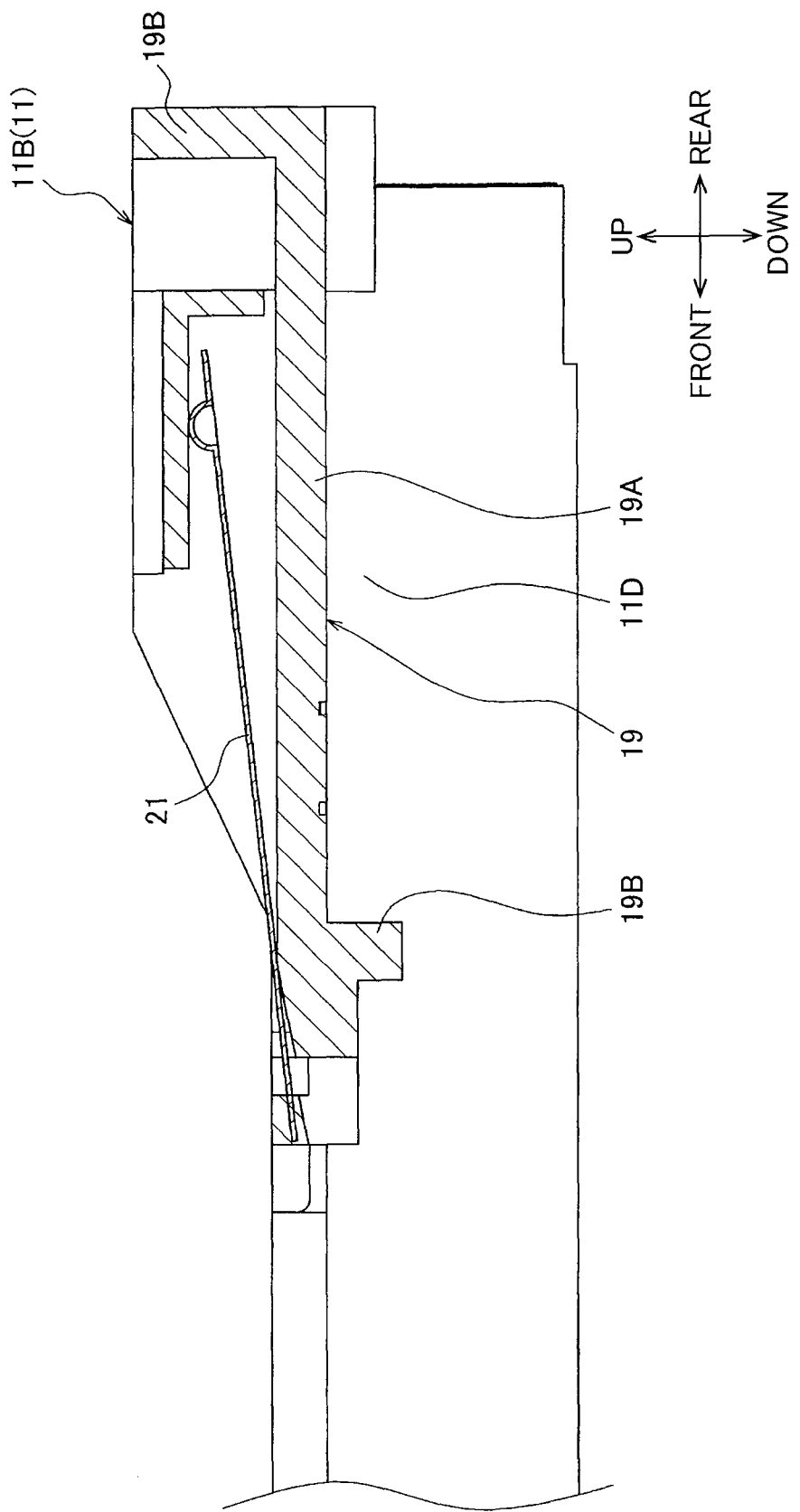
FIG. 8 is a cross-sectional view viewed from a direction A-A of FIG. 7.
Figure 9:
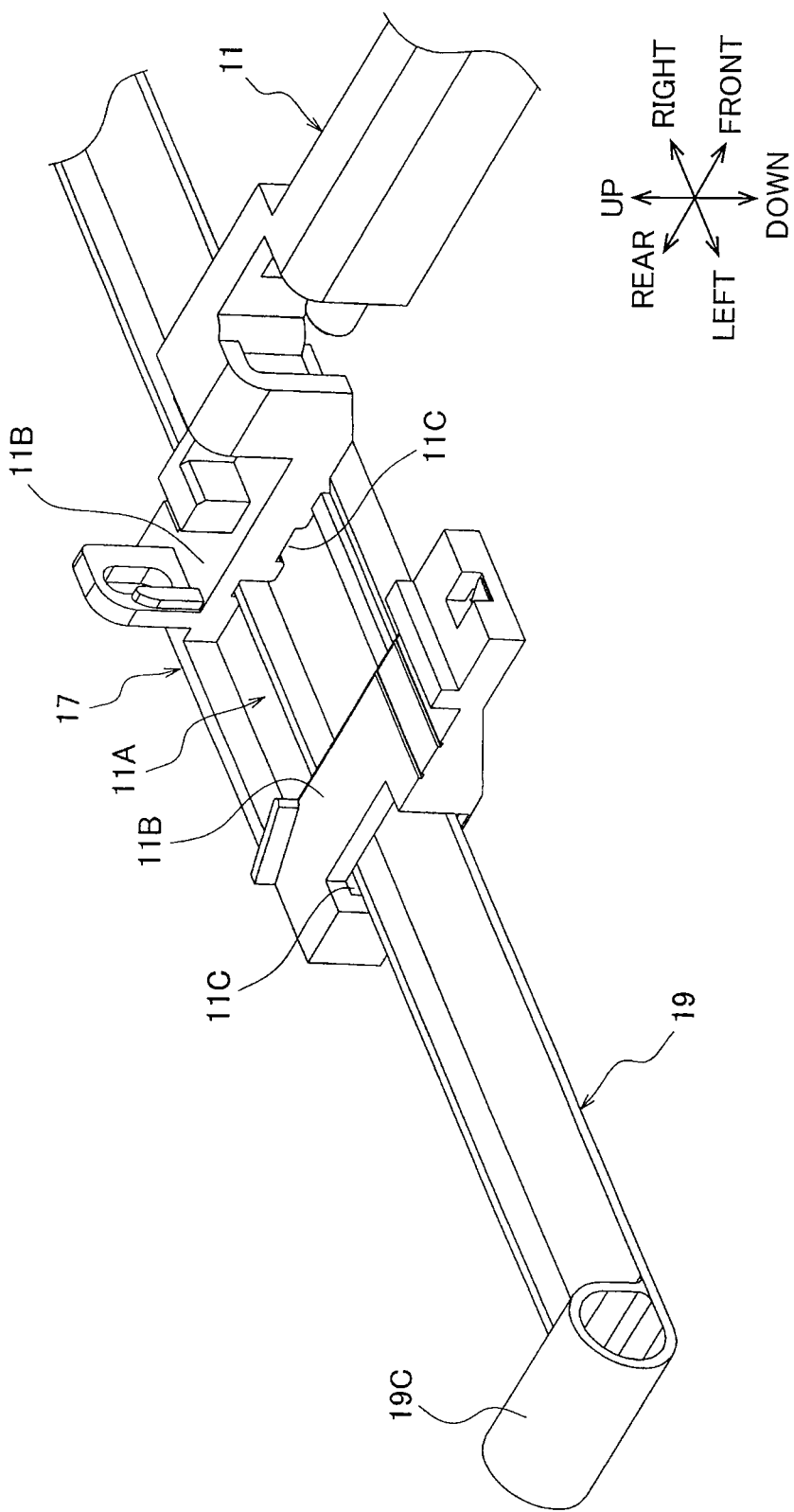
FIG. 9 shows a cress-sectional view showing a groove to which an image capturing unit is attached according to the first embodiment.

The resisting member 21 is accommodated in at least one of the pair of walls 11B. According to the embodiment, the resisting member 21 is an elastic member such as a plate spring, and is accommodated in the wall 11B on the curved portion 15A side. As shown in FIG. 8, the resisting member 21 urges the tension bar 19 toward the carriage 11 (a bottom 11D of the groove 11A).

A frictional force at a contact surface of the tension bar 19 and the resisting member 21 and/or the frictional force at a contact surface of the tension bar 19 and the carriage 11 affect as a resistive force that resists the displacement of the tension bar 19.

An end portion 19D of the tension bar 19 at the end portion opposite to the end portion where the contact portion 19C is formed extends on a side opposite to the curved portion 15A with respect to the carriage 11. The end portion 19D (the right-end portion) contacts a stopper wall 3A formed on a side wall of the document table 3 when the carriage 11 moves such that the distance between the curved portion 15A and the carriage 11 increases (i.e., the carriage 11 moves to perform the second scanning operation).

Figure 5:
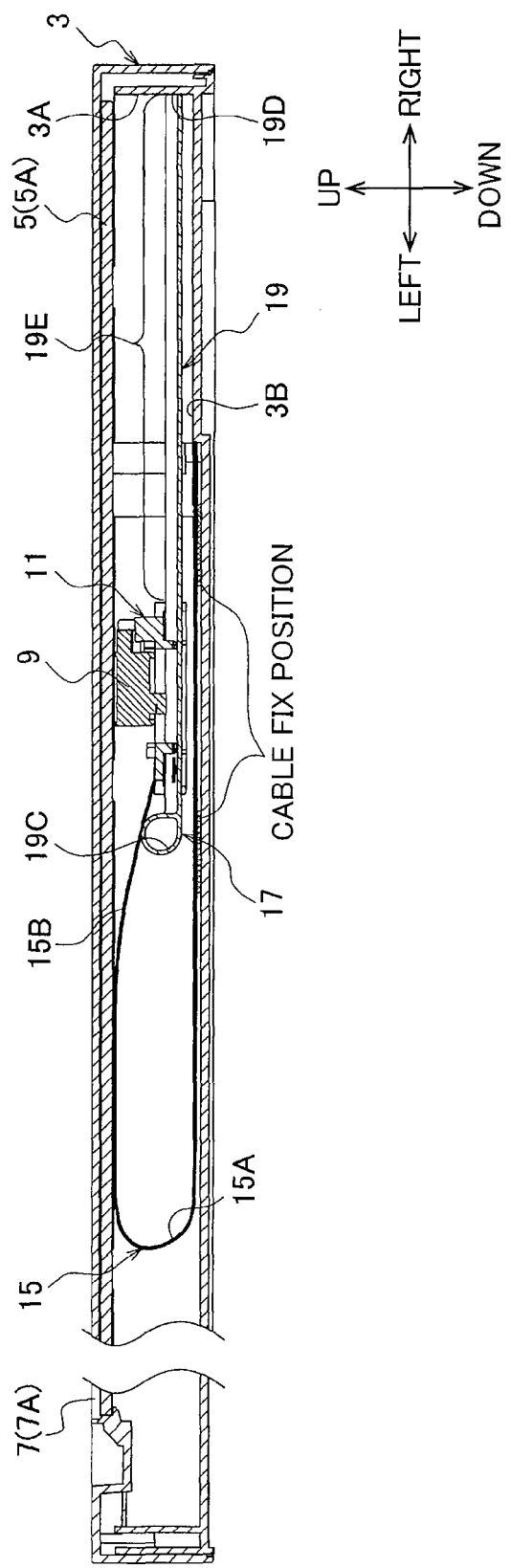

A portion 19E of the tension bar 19 between the carriage 11 and the right end portion 19D is spaced from the bottom portion 3B of the document table 3 by a predetermined amount, regardless of the location of the carriage 11 (see FIGS. 4 and 5).

Specifically, a distance from the bottom portion 3B to the tension bar 19 ("predetermined amount") is determined such that, even if a portion of the cable 15 from the curved portion 15A to the portion secured to the document table 3 (i.e., a portion of the cable 15 located on the bottom portion 3B) is bent and tends to buckle, the bending will not proceed to cause the buckling due to the sufficiently small distance between the bottom portion 3B ad the tension bar 19. It is preferable that the distance is not more than ⅓ of the distance from the bottom portion 3B to the platen 5A.

The tension bar 19 extends in a direction parallel with a direction where the carriage 11 moves. Therefore, a portion of the tension bar 19 from the carriage 11 to the contact portion 19C is also spaced from the bottom portion 3B of the document table 3 by the same predetermined amount.

The buckling (deformation) of the cable 15 is caused when the compressing force is applied to the cable 15. Therefore, the portion of the cable 15 located on the bottom portion 3B is deformed when the carriage 11 moves in a direction where the distance between the curved portion 15A and the carriage 11 increases.

When the second scanning operation is performed, the carriage 11 moves from the home position (see FIG. 3) in the direction where the distance between the curved portion 15A and the carriage 11 increases (hereinafter, this movement direction will be referred to a rightward movement). When the carriage 11 is at the home position, the curved portion 15A and the carriage 11 are closest. Thus, the contact portion 19C is also closest to the carriage 11, and with this state, the carriage 11 starts moving rightward.

As the carriage 11 proceeds, the right end 19D of the tension bar 19 contacts the stopper wall 3A (see FIG. 5). At this stage, the tension bar 19 is prevented from further moving rightward. However, a relative movement between the tension bar 19 and the carriage 11 is allowed. Therefore, while the tension bar 19 stays with the right end 19D contacting the stopper wall 3A, the carriage 11 moves rightward with respect to the document table 3 (see FIG. 6). In other words, the tension bar 19 relatively displaces with respect to the carriage 11 such that the contact portion 19C moves away from the carriage 11 as the carriage 11 moves rightward.

When the second scanning operation is completed and the carriage 11 returns to the home position, the carriage 11 moves toward the curved portion 15A as shown in FIG. 4. Therefore, the contact portion 19C contacts the inner surface of the curved portion 15A and the tension bar 19 urges the curved portion 15A toward the first window 7 (i.e., the left-hand side in FIG. 4).

Figure 3:
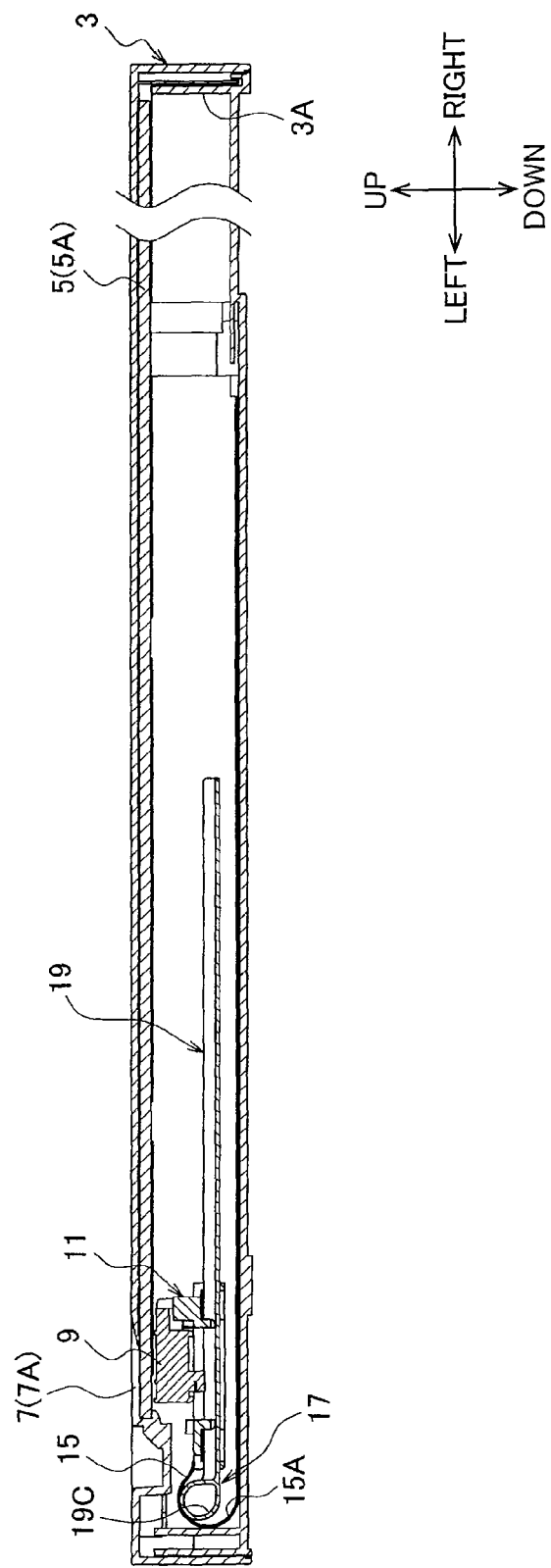
FIGS. 3-6 are cross-sectional views viewed from a direction A-A of FIG. 2 and show an operation of a tension bar according to the first embodiment.

As the carriage 11 moves leftward, a distance between the curved portion 15A and the carriage 11 is reduced. As shown in FIGS. 4 and 3 in this order, since the tension bar 19 moves such that the contact portion 19C approaches the carriage 11, and a frictional force between the tension bar 19 and the carriage 11 is applied to the curved portion 15A of the cable 15 as a pressing force F.

The direction of the pressing force F is a direction where the curved portion 15A and the carriage 11 separate. Therefore, the tension applying mechanism 17 applies tension to the straight portion 15B of the cable 15.

As described above, in association with the reciprocal movement of the carriage 11, the tension bar 19 displaces relative to the carriage 11. A distance L2 between the contact portion 19C and the carriage 11 when the contact portion 19C is furthest from the carriage is not more than a half of a traveling distance L3 of the carriage 11 (see FIG. 2).

As described above, since the tension applying mechanism 17 applies tension to the straight portion 15B. Therefore, the force applied to the straight portion 15B is a combination of the force the tension applying mechanism 17 applies the straight portion 15B and the force applied to the straight portion 15B as a result of the movement of the carriage 11 toward the curved portion 15A.

With the above configuration, the compression force applied to the straight portion 15B can be reduced, or the force applied to the straight portion 15B can be made zero or pulling force. Therefore, according to the above configuration, it becomes possible to suppress buckling of the straight portion 15B.

Figure 6:
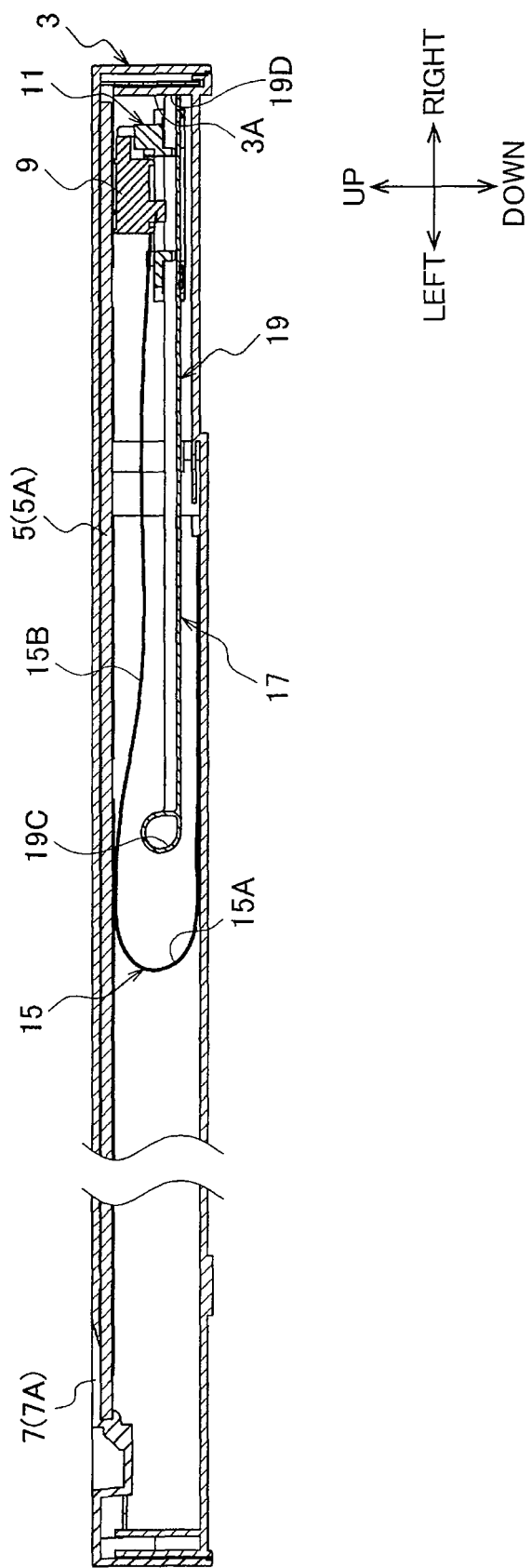

The cable 15 (the straight portion 15B) may contact the platen 15A (see FIGS. 5 and 6). If the scanner is in a relatively high humid environment, or if the surface of the cable 15 is rough due to scratches, a frictional index between the platen 5A and the cable 15 becomes relatively high. In such a case, if the straight portion 15B contacts the platen 5A, the buckling may occur easily. Further, if the temperature is raised and the Young's modulus of the cable 15 is reduced, buckling of the straight portion 15B is easy to occur.

On the contrary, if the Young's modulus of the cable 15 is high, the cable 15 may not curve at the curved portion 15A easily. In such a case, a large driving force for moving the carriage 11 is required, which causes upsizing of the motor 13D and the like.

According to the embodiment, since the tension is applied to the straight portion 15B, the buckling of the straight portion 15B can be suppressed with suppressing the upsizing of the motor 13D and without being affected by the environmental temperature and humidity.

Since the portion 19E, which is a portion opposite to the contact portion 19C with respect to the carriage 11, is spaced from the bottom 3B of the document table 3. Therefore, even if the portion of the cable 15, which portion is opposite to the curved portion 15A with respect to the carriage 11, is bent, the portion 19E functions to prevent the buckling of such a portion of the cable 15. Thus, an S-shaped deformation can be prevented.

The pressing force F applied to the curved portion 15A is generated making use of the frictional force when the tension bar 19 is displaced relative to the carriage 11. Therefore, by adjusting the elastic force the resisting member 21 applies to the tension bar 19, it becomes possible to adjust the tension applied to the straight portion 15B so that an appropriate tension can be applied to the straight portion 15B.

Since the contact portion 19C having a smooth curved surface is provided at the end of the tension bar 19, damages of the cable 15 as a result that the tension bar 19 contacts the cable 15 can be well suppressed.

Further, according to the above-described configuration, a portion of the tension bar 19, which portion is a portion between the contact portion 19C and the carriage 11, and the cable 15 are separated. Therefore, portions at which the tension bar 19 contacts the cable 14 can be reduced, and damages of the cable 15 can be suppressed.

Since the direction in which the force is applied to the carriage 11 at the connection portion 15C where the cable 15 and the carriage 11 are connected, and the direction of the driving force the belt 13B applies to the carriage 11 are opposite to each other. Therefore, when the carriage 11 moves, moment of a couple is applied to the carriage 11 and the movement of the carriage 11 may be prevented. According to the embodiment, the distance d1 is designed to be less than a half of the length L11. Therefore, the moment of a couple can be lessened, and the movement of the carriage 11 will not be prevented.

According to the embodiment, the width (the size in the rear and front direction) of tension bar 19 is smaller than the size of the image scanner 1 in the width direction (i.e., in the direction parallel to the longitudinal direction of the image capturing unit 9; the front-and-rear direction). Thus, the buckling of the straight portion 15B of the cable 15 can be suppressed with avoiding upsizing of the image scanner 1 in the width direction.

According to the embodiment, the carriage 11 is formed with the groove 11A having the cornered U-shaped cross section along a plane parallel to the moving direction of the carriage 11 for receiving the image capturing unit 9. Further, the support openings 11C that slidably support the tension bar 19 are formed on the pair of walls 11B which face each other with the groove 11A therebetween. Thus, the tension bar 19 is supported at a position shifted from the image capturing unit 9 in the moving direction of the carriage 11.

With the above configuration, in comparison with a case where the tension bar 19 is provided immediately below the image capturing unit 9, the tension bar 19 can be arranged closer to the image capturing unit 9. Accordingly, the height of the image scanner 1 (i.e., the size in a direction perpendicular to the width direction and the moving direction of the carriage 11) can be reduced.

Further, according to the embodiment, the plate spring configuring the resisting member 21 is provided in at least one of the pair of walls 11B. Therefore, in comparison with a case where the resisting member 21 is provided immediately below the image capturing unit 9, the height of the image scanner can be reduced.

According to the embodiment, a spring member (e.g., a plate spring) is used as the resisting member 21. It is advantageous to use the spring member since the frictional force is applied to the tension bar 19 evenly and it is ensured that the tension is applied to the straight portion 15B.

According to the embodiment, the tension bar 19 has a rectangular surface 19A and a protruded surface 19B which is perpendicular to the rectangular surface 19A. With this configuration, the rigidity in bending is improved. Further, by forming the support openings 11C to meet the cross section of the tension bar 19, it becomes possible to use the support openings 11C as a guide for movement of the tension bar 19.

The invention needs not be limited to the above-described exemplary configuration, but can be modified in various ways without departing from the aspects of the invention.

Figure 10:
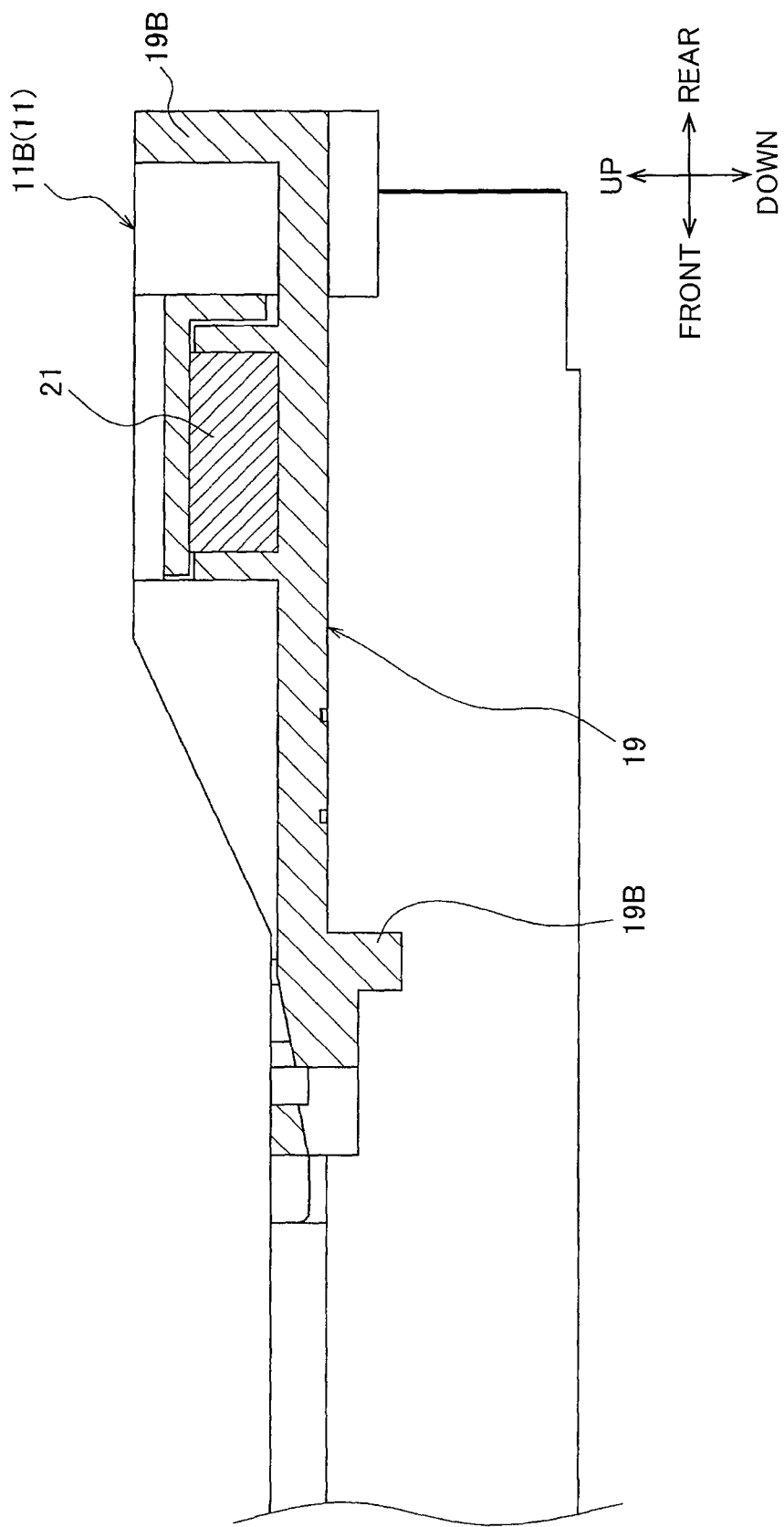
FIG. 10 is a cross-sectional view corresponding to FIG. 8 and according to a second embodiment.

In the above-described, the plate spring is used as the resisting member 21. According to a second embodiment described below, another type of elastic member such as sponge or rubber is used as the resisting member 21 as shown in FIG. 10.

In the above-described embodiments, the resisting member 21 directly contacts the tension bar 19. The invention needs not be limited to such a configuration, and the resisting member 21 may indirectly contact the tension bar 19, with a certain member between the resisting member 21 and the tension bar 19. It is also possible that the tension bar 19 may indirectly contact the carriage 11.

According to the above-described embodiments, when the distance between the curved portion 15A and the carriage 11 reduces, tension is not always applied to the straight portion 15B. If the tension is applied to the cable 15 at certain timings when the carriage 11 is moved to approach the curved portion 15A, the buckling of the straight portion 15B can be suppressed necessarily and sufficiently. Therefore, the image scanner may be configured such that the tension is always applied to the straight portion or the tension may be applied to the straight portion 15A at a certain timing when the carriage 11 is approaching the curved portion 15A.

In the above-described embodiments, the buckling of the straight portion 15B is suppressed only by the tension applying mechanism 17. However, the present invention needs not be limited to such a configuration, and the buckling may be suppressed by use of the tension applying mechanism 17 in combination of the tension tape.

According to the embodiments, the tension applying mechanism is provided as a moving body. Specifically, the tension applying mechanism has a pressing member (contacting portion 19C) that contacts the curved portion 15B of the cable 15. The invention needs not be limited to such a configuration. If the tension is applied to the cable when the distance between the curved portion and the moving member decreases, any configuration can be employed.

For example, as the pressing member, a coil spring, a bellows, an expandable/shrinkable bag-like elastic member such as a rubber balloon, a flexible bag-like member may be used. When the bellows, expandable/shrinkable bag-like elastic member, or a flexible bag-like member is employed, fluid such as the air may be inflated/deflated in mechanical association with the movement of the moving member.

According to the embodiments, the tension applying mechanism 17 is configured such that the tension bar 19 is movably coupled to the carriage (movable in the direction parallel with the moving direction of the carriage 11) and the tension bar 19 is moved relative to the carriage 11 when the end of the tension bar 19 contacts the curved portion 15A and the distance therebetween is reduced. The present invention needs not be limited to such a configuration, and an alternative configuration may be employed.

FIG. 11 schematically shows an alternative structure for moving a tension roller. According to the alternative embodiment, a pair of fixed pulleys FP1 and FP2 is provided on inner walls at both sides in the moving direction of the carriage 11. A tension roller TR is provided to contact the curved portion 15A of the cable 15 from the inside of the curvature, and a movable pulley MP is connected to the tension roller TR. A wire WR is provided such that an end EP1 is connected on an inner wall of the document table 3, the wire WR being wound around the movable pulley MP, the fixed pulley FP1, and the fixed pulley FP2 in this order, and the other end of the wire EP2 is connected to the carriage 11 on a side opposite to the side where the tension roller TR is arranged. The movable pulley MP and the tension roller TR has a width (i.e., length in the axial direction) longer than the width of the cable 15, and both ends of the tension roller TR and the movable pulley MP are rotatably connected, respectively. With the above configuration, in association with the movement of the carriage 11, the tension roller TR is moved as the moving pulley MP moves.

What is claimed is:

1. A cable arrangement structure, comprising:
   a base member;
   a movable body configured to reciprocally move relative to the base member;
   a driving unit configured to drive the movable body to reciprocate;
   a flexible cable transmitting electrical signals, one end of the flexible cable being fixedly connected to the base member, another end of the flexible cable being connected to the movable body, the flexible cable having a curved portion, and both ends of the flexible cable being located on a same side with respect to the curved portion; and
   a tension applying unit configured to contact the curved portion of the flexible cable from an inner side of a curvature of the curved portion to apply tension to the flexible cable when the curved portion is located on a front side of the movable body as moved, application of the tension to the flexible cable being controlled in mechanical association with movement of the movable body.

2. The cable arrangement structure according to claim 1,
   wherein the tension applying unit includes a pressing member which is coupled to the moving body and extends toward the curved portion, a tip end of the pressing member contacting the curved portion from an inner side, and
   wherein the tension applying unit is configured such that tension is applied to the flexible cable as a distance between the curved portion and the movable body decreases with the pressing member contacting the curved portion from the inner side.

3. The cable arrangement structure according to claim 2, wherein the tip end of the pressing member is formed to have a smooth curved surface.

4. The cable arrangement structure according to claim 2, wherein a portion of the pressing member within a range between the movable body and the tip end is spaced from the flexible cable.

5. The cable arrangement structure according to claim 2, wherein a distance between the tip end and the movable body when the tip end is furthest from a movable end is not more than a half of a length of a path the movable body travels in one direction.

6. The cable arrangement structure according to claim 2,
   wherein the pressing member is coupled to the movable body such that the pressing member is movable in a direction parallel with a moving direction of the movable body, and
   wherein the pressing member is displaceable with respect to the movable body when the distance between the curved portion and the movable body decreases with the tip end of the pressing member contacting the curved portion from the inner side.

7. The cable arrangement structure according to claim 6, further includes a resisting member that applies frictional resistance to the pressing member when the distance between the curved portion and the movable body decreases and the pressing member moves with respect to the movable body.

8. The cable arrangement structure according to claim 7, wherein the resisting member includes an elastic body which is elastically deformable.

9. The cable arrangement structure according to claim 6, further includes a returning unit, wherein when the movable body moves so that the distance between the curved portion and the movable body increases, the returning unit causes the pressing member to displace so that the tip end of the pressing member is spaced from the movable body.

10. The cable arrangement structure according to claim 9,
    wherein a portion of the pressing member extends on a side opposite to the curved portion with respect to the movable body, and
    wherein the returning unit includes a stopper wall to which an end portion of the pressing member bumps when the moving body moves in a direction where the distance between the curved portion and the movable body increases.

11. The cable arrangement structure according to claim 10, wherein a portion of the pressing member opposite to the curved portion with respect to the movable body is spaced from the base member at a predetermined clearance.

12. The cable arrangement structure according to claim 1, wherein the movable body has an elongated shape, which is elongated in a direction perpendicular to a movable direction, and wherein a distance between a connected portion where the cable and the movable body are connected and an acting point at which the driving unit applies a driving force to the movable body is not more than a longitudinal length of the movable body.

13. An image scanner, comprising:
    an image capturing unit; and
    a cable arrangement structure, which includes:
      a base member;
      a movable body configured to reciprocally move relative to the base member, the image capturing unit being mounted on the movable body;
      a driving unit configured to drive the movable body to reciprocate;
      a flexible cable transmitting electrical signals, one end of the flexible cable being fixedly connected to the base member, another end of the flexible cable being connected to the movable body, the flexible cable having a curved portion, and both ends of the flexible cable being located on a same side with respect to the curved portion; and
      a tension applying unit configured to contact the curved portion of the flexible cable from an inner side of a curvature of the curved portion to apply tension to the flexible cable when the curved portion is located on a front side of the movable body as moved, application of the tension to the flexible cable being controlled in mechanical association with movement of the movable body.

14. The image scanner according to claim 13,
    wherein the tension applying unit includes a pressing member which is coupled to the moving body and extends toward the curved portion, a tip end of the pressing member contacting the curved portion from an inner side, and
    wherein the tension applying unit is configured such that tension is applied to the flexible cable as a distance between the curved portion and the movable body decreases with the pressing member contacting the curved portion from the inner side,
    wherein the pressing member is coupled to the movable body such that the pressing member is movable in a direction parallel with a moving direction of the movable body, and
    wherein the pressing member is displaceable with respect to the movable body when the distance between the curved portion and the movable body decreases with the tip end of the pressing member contacting the curved portion from the inner side, and wherein the pressing member is located below the image capturing unit such that the image capturing unit overlaps a part of the pressing member when viewed from the above.

15. The image scanner according to claim 14,
wherein the movable body is formed with a groove having a cornered U-shape cross section on a plane perpendicular to the moving direction of the movable body, the groove being configured to receive the image capturing unit, and wherein supporting sections that displaceably support the pressing member are formed on a pair of walls that face each other with the groove located therebetween.

* * * * *